Oct. 9, 1951       R. ANXIONNAZ ET AL       2,570,629
ADJUSTABLE PIPE FOR THE INTAKE OF AIR AND EXPANSION
OF THE DRIVING GASES IN REACTION JET PROPELLERS
FOR PROJECTILES AND VEHICLES
Filed Sept. 17, 1946       2 Sheets-Sheet 1
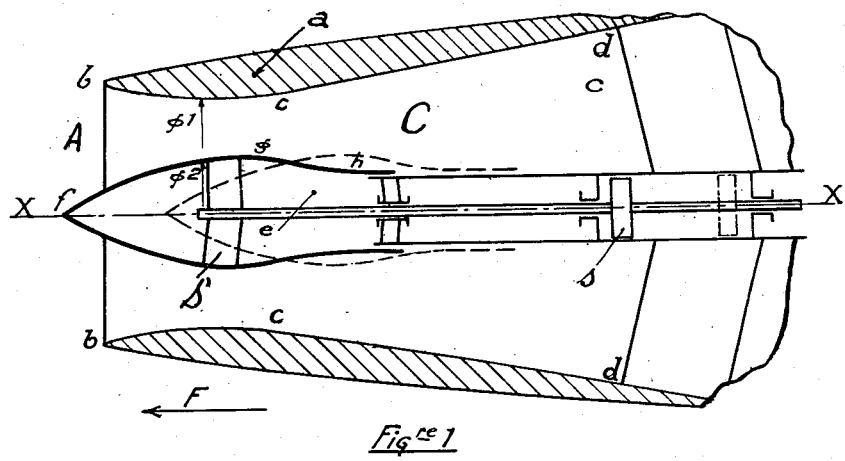
Fig.re 1
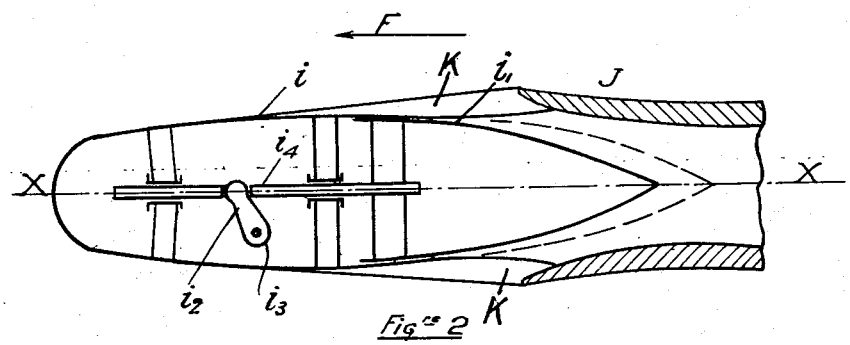
Fig.re 2
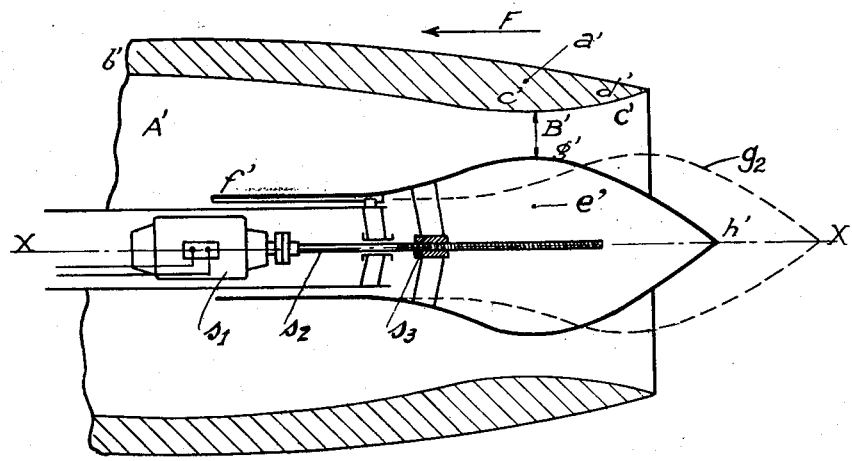
Fig.re 3
INVENTOR
R. Anxionnaz & R.J. Imbert
By Watson, Cole, Grindle & Watson
ATTORNEYS Oct. 9, 1951 R. ANXIONNAZ ET AL 2,570,629
ADJUSTABLE PIPE FOR THE INTAKE OF AIR AND EXPANSION
OF THE DRIVING GASES IN REACTION JET PROPELLERS
FOR PROJECTILES AND VEHICLES
Filed Sept. 17, 1946 2 Sheets-Sheet 2
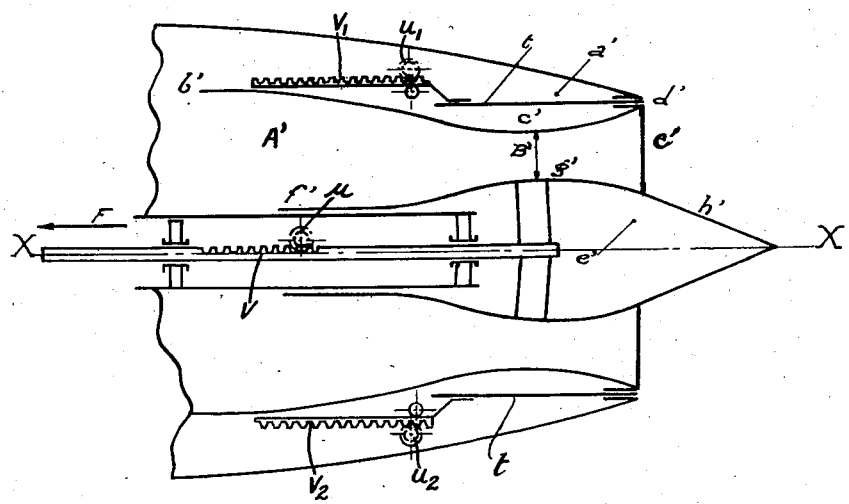
Fig.ce 4
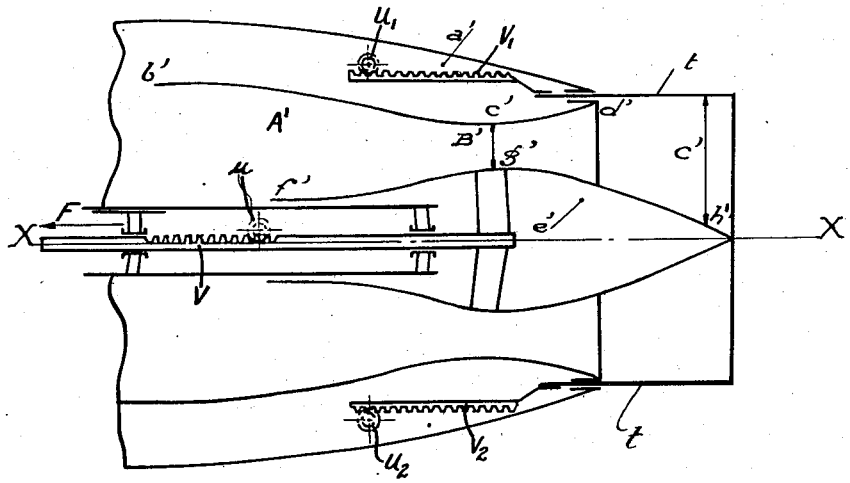
Fig.ce 5
INVENTOR
R. Anxionnaz & R. J. Imbert
By Watson, Cole, Grindle & Watson
ATTORNEYS Patented Oct. 9, 1951

2,570,629

UNITED STATES PATENT OFFICE 2,570,629

ADJUSTABLE PIPE FOR THE INTAKE OF AIR AND EXPANSION OF THE DRIVING GASES IN REACTION JET PROPELLERS FOR PROJECTILES AND VEHICLES

René Anxionnaz and Roger Jean Imbert, Paris, France, assignors, by direct and mesne assignments, of one-half to said Anxionnaz and one-half to Societe Rateau (Societe Anonyme), Paris, France, a company of France Application September 17, 1946, Serial No. 697,426
In France October 5, 1945

1 Claim. (Cl. 60—35.5)

The actual state of the art allows foreseeing the realization, through reaction jet propulsion, of projectiles, vehicles and more particularly of aircraft assuming, in the midst of the fluid inside which they move, speeds of progression which are equal to or above that of sound in the same medium. The driving energy of the reaction jet engine may be provided in particular by the atmospheric air taking part in a thermic cycle which latter includes in principle a preliminary compression, a heating and an expansion inside a propelling nozzle. By reason of the high speed of the apparatuses considered, it is important to transform the kinetic energy of the relative wind into a potential energy with the best efficiency possible. Similarly the exhaust speed of the driving gases should be more considerable than that of the vehicle and it should be generally above the speed of sound or at least of the same magnitude as said speed.

As the air operated upon is a compressible fluid as well as the exhaust gases, the air intake and the exhaust nozzle should be designed so as to suit supersonic flow rates and their shape should be different from that of the similar parts provided for flows at speeds lower than sound speed.

The present invention has for its object to provide nozzle arrangements for the air intake and for the reaction jet which are adapted to supersonic rates of operation and it has for its further object the adjustment of such nozzles in accordance with the possible modifications in altitude and in speed of displacement and of the amount of fuel used by the jet propelling engine.

According to the invention, the pipes having convergent-divergent cross-sections include a minimum cross-sectional area or neck between the convergent and divergent parts and are provided also with means for modifying said cross-sectional area at the neck according to the conditions of operation, the compression and the expansion being both ensured with the best efficiencies.

The following description given out with reference to accompanying drawings as an example and by no means in a limitative sense will allow a better understanding of the execution of the invention.

Fig. 1 is a longitudinal cross-section of a special air intake for supersonic speeds with an adjustable neck.

Fig. 2 shows similarly a form of execution of an air intake having an annular cross-section.

Fig. 3 illustrates a half cross-section of a supersonic expansion nozzle with an adjustable neck.

Lastly, Figs. 4 and 5 illustrate in a similar manner a supersonic expansion nozzle including double adjusting means for the cross-section at the neck and for the final cross-section.

It is known that for transforming into potential energy the kinetic energy of a flux of air and more generally of a compressible fluid assuming a supersonic speed, the arrangement required should include a convergent nozzle inside which is operated a first compression stage which is ended as soon as the speed or flow reaches the local speed of sound and then a divergent nozzle wherein the damping of the speed and the second stage of the compression are performed at subsonic rates. The cross-sectional area of the passage is a minimum at the connection between the convergent nozzle and the divergent nozzle in a cross-section forming the neck of the flow passage.

According to a first embodiment of the invention, and in order that the supersonic air intake may be adapted under the best conditions of efficiency to the different speeds and air outputs which may appear in the operation of the propelling means, the cross-section at the neck is adjustable. Fig. 1 shows by way of example an embodiment of said adjusting means.

The air intake means includes an outer stationary casing $a$ the longitudinal cross-section of which shows along its inner surface the outline $b$, $c$, $d$, and a central throttle member $e$ adapted to move inside said casing along the longitudinal axis X—X and the outline of which is $f$, $g$, $h$. These two parts $a$ and $e$ may form bodies of revolution round the axis X—X or more generally bodies the transverse cross-sections of which are of any desired shape. By way of example and in particular as illustrated in the drawing showing a body of revolution around X—X, the diameter $\phi 1$ of the neck is provided for the rate of operation which requires the largest cross-section at the neck, the throttle member $e$ being then completely retracted inside the casing as shown in broken lines in Fig. 1. The diameter $\phi 2$ of the throttle member is such that for the advanced position of the latter to the left the annular cross-section $\phi 1 - \phi 2$ forms the smallest cross-section required at the neck of the air intake as shown in full-drawn lines in Fig. 1. The throttle member may assume any intermediate position between the two extreme positions described. The direction of displacement of the vehicle and of the projectile with reference to the ambient atmosphere is given by the arrow F. The outlines $b$, $c$, $d$ and $f$, $g$, $h$ are drawn in a manner such that the channel formed between them appears first as convergent at A and then as divergent at C.

In the embodiment illustrated, the axial displacement of the throttle member is obtained through an auxiliary engine having a piston $s$ the rod of which is suitably guided and connected with the throttle member by arms $s'$.

If the air intake is to be obtained around a stream-lined body which may constitute the front part of the vehicle it may be executed as illustrated in Fig. 2. In this case $i$ designates the stream-lined body and $J$ the outer casing of the air intake of the jet propeller which can be secured to the body $i$ in any suitable manner, for example longitudinal arms $K$. The outline of the body $J$ is designed in a manner such that the channel formed between the inner surface of said body $J$ and the tail $i1$ of the body $i$ shows again here a convergent portion, a neck, and a divergent portion. The adjustment of the cross-section at the neck is obtained through the relative displacement of the tail part $i1$, of the body $i$ with reference to the body $J$. Under such conditions, advantage is taken of the slowing down of the air stream already obtained in the boundary layer at the periphery of the body $i$. In the example shown, the displacement of $i1$ is obtained through a projection $i2$ adapted to pivot round an axis $i3$ and engaging a notch in a rod $i4$ which is suitably guided and is connected with $i1$.

As for the jet nozzle providing for the expansion of the driving gases at the rear of the propelling means, its operation under supersonic conditions requires also the provision of a convergent part, a neck and a divergent part. To ensure expansion under the best conditions and for the different rates of operation of the propelling means, the invention includes a double adjustment: to wit the adjustment of the cross-section at the neck of the nozzle and the adjustment of the final cross-section of the nozzle.

It should be noticed that under subsonic conditions of operations it is sufficient to adjust only the final cross-section of the nozzle.

Fig. 3 shows by way of indication an embodiment of such a nozzle for the expansion of the gases. This arrangement includes an outer casing $a'$ the longitudinal cross-section of which shows at its internal surface an outline $b'$, $c'$, $d'$ and a central throttle member $e'$ adapted to move longitudinally inside the nozzle and the outline of which is $f'$, $g'$, $h'$. Said two members may assume the shape of bodies of revolution or more generally of bodies the transverse cross-sections of which may assume any shape. By way of example, the minimum cross-section at the neck is obtained as shown in full drawn-lines when the points $c'$ and $g'$ are in register and the output cross-section of the nozzle corresponds to the annular surface comprised between $d'$ and $h'$. In the position of the throttle member illustrated in interrupted lines, the points $d'$ and $g2$ being in register, the nozzle is a convergent one with an outlet cross-section which is larger than precedingly, the rate of flow being then sonic or subsonic. The outlines of the two members at $b'$, $c'$, $d'$ and $f'$, $g'$, $h'$ are such that under supersonic conditions, the channel formed comprises first a convergent part $A'$, then a neck $B'$ and lastly a divergent part $C'$ as illustrated in Fig. 3, while for the intermediary positions of the throttle member $e'$ the cross-section at the neck and the divergence obtained may correspond to requirements. Moreover, the outline of the outer casing is characterized by a diameter at $d'$ which is larger than at $c'$.

The displacement of the closing member $e'$ is supposed to be executed in the example chosen by means of an electric motor $s1$ controlling the rotation of a screw $s2$ which provides for an advancing or receding motion of the nut $s3$ rigid with the throttle member.

In certain cases and in particular when the exhaust speed of the gases rises considerably, the divergence obtained through the above means would be insufficient. This drawback is removed according to a further embodiment of the invention by incorporating to the outer casing a telescopic extension as illustrated in Figs. 4 and 5. The arrangement of the nozzle and of its throttle member is the same as in the case of Fig. 3 but it comprises in addition thereto a telescopic tube $t$ which may be completely retracted inside the body $a'$ (Fig. 4) or else projected beyond same (Fig. 5). It is immediately apparent that for a given position of the throttle member $e'$ i. e. for a same value of the cross-section at the neck it is possible to obtain independently of said cross-section at the neck different output cross-sections for the nozzle according to the ratio of expansion required, through a suitable displacement of the telescopic tube $t$.

In the example of Figs. 4 and 5, the control means for the throttle member $e'$ and for the telescopic tube $t$ are constituted through pinions $u$, $u1$, $u2$ cooperating with racks $v$, $v1$, $v2$ secured respectively to said throttle member and to said tube.

Obviously the forms of execution described have been given out by way of examples and they may be modified as desired chiefly through substitution of technically equivalent means for those disclosed without widening thereby the scope of the invention as defined in accompanying claim.

What we claim is:

In a jet propulsion engine for projectiles, aircraft and the like vehicles adapted to move at supersonic speeds, a jet forming nozzle arrangement providing for the transformation between the potential and kinetic forms of fluid energy, comprising an outer shaped casing provided with an outlet opening, a throttle member arranged in said casing near said outlet opening, said throttle member having a spindle shaped outer surface providing between it and said casing an annular convergent divergent jet forming passage having a neck of restricted area, means for shifting said throttle member longitudinally of the outer casing for adjusting the cross-section at the neck in accordance with the conditions of operation, a telescopic tube fitted at the outlet of the outer casing for extending same around said spindle shaped throttle member and means for controlling the length of projection of said telescopic tube.

RENÉ ANXIONNAZ.
ROGER JEAN IMBERT.

REFERENCES CITED

The following references are of record in the file of this patent:

UNITED STATES PATENTS

| Number | Name | Date |
|---|---|---|
| 2,024,274 | Campini | Dec. 17, 1935 |
| 2,402,363 | Bradbury | June 18, 1946 |
| 2,418,488 | Thompson | Apr. 8, 1947 |
| 2,460,289 | Hickman | Feb. 1, 1949 |
| 2,501,633 | Price | Mar. 21, 1950 |

FOREIGN PATENTS

| Number | Country | Date |
|---|---|---|
| 50,033 | France | Aug. 1, 1939 |
| (3rd Addition to No. 779,655) | | |

OTHER REFERENCES

Astronautics, Mar. 1944, page 12.